3,595,602
Patented July 27, 1971

3,595,602
NOVEL FIBER REACTIVE ULTRAVIOLET LIGHT ABSORBERS AND THEIR USE IN CELLULOSE TEXTILE MATERIALS
John Christian Oppelt, Manville, Frederic Houghton Megson, Martinsville, and Michael Thomas Beachem, Somerset, N.J., assignors to American Cyanamid Company, Stamford, Conn.
No Drawing. Original application Mar. 13, 1967, Ser. No. 622,396, now Patent No. 3,535,318, dated Oct. 20, 1970. Divided and this application Apr. 6, 1970, Ser. No. 31,053
Int. Cl. D06m 13/34, 13/30; D06p 5/08
U.S. Cl. 8—74                                  6 Claims

ABSTRACT OF THE DISCLOSURE

This invention relates to new mono-aromatic-penta-alkyl ethers of hexamethylolmelamine and to their use in imparting crease-resistance to cellulosic textile materials. The new ethers of hexamethylolmelamine impart crease-resistance to cellulosic textile materials without any adverse effect on the light-fastness of such materials that have been dyed with direct dyes.

---

This is a division of application Ser. No. 622,396, filed Mar. 13, 1967, now U.S. Pat. No. 3,535,318.

This invention relates to new mono-aromatic-penta-alkyl ethers of hexamethylolmelamine and to textile finishes for imparting wrinkle-recovery and crease-resistance to cellulosic textile materials. More particularly, it relates to etherified melamine-formaldehyde precondensates and their use on cellulose textile materials. Still more particularly, it relates to the use of new etherified methylolated melamines of the Formula I:

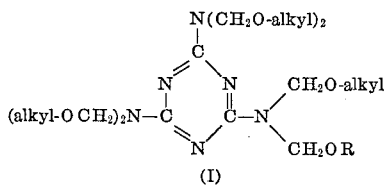

(I)

wherein "alkyl" is an alkyl group of from 1 to 4 carbon atoms and R is an aromatic group having up to about 4 rings. Thus R may be carbocyclic such as phenyl, naphthyl, biphenylyl, benzoylphenyl, acetylphenyl, phenylalkylphenyl, phenoxyphenyl, phenylthiophenyl, phenylaminophenyl, and the like. The aromatic group may also be a heterocyclic moiety such as benzotriazolylphenyl or triazinylphenyl wherein the triazinyl moiety is substituted by other phenyl radicals. The phenyl radicals appearing in the R group may be substituted by radicals such as lower-alkyl, hydroxy, lower-alkoxy, lower-alkenyl, carboxy-(lower-alkenyl), nitro, cyano, halo e.g., chloro, bromo or iodo) trihalomethyl e.g. trifluoromethyl or trichloromethyl, lower-alkyl mercapto, and the like.

Use of aminoplast resins to impart crease-resistance to cellulosics is well-known. These resins perform their function economically and efficiently without adversely affecting many of the desirable properties of cellulosics, such as for example, the fabric hand, soil-resistance or fabric durability. However, aminoplast resins do, in some cases, have an adverse effect on color stability of dyed cellulosics. Thus, it is well-known that aminoplast crease-preventing finishes can cause accelerated fading of many direct dyes, i.e., the light-fastness of cellulosic textile material dyed with direct dyes is often reduced when the dyed material is after-treated with an aminoplast resin or reactant such as urea-formaldehyde, or a melamine-formaldehyde condensate. Commercial resins which have been shown to cause fading of certain direct dyes include hexa(methoxymethyl)melamine, polymethylol-urea with slight degree of methylation, blends of partially methylated hexamethylolmelamine and urea-formaldehyde reaction products and methylated trimethylolmelamine. Furthermore, while the aminoplast textile finishing agents do impart crease-resistance and wrinkle-recovery properties to cellulosic fabrics, they do not prevent degradation of the cellulosic material by ultraviolet light with the consequence that, if light stability is required, other textile finishing agents must be used in conjunction with the conventional aminoplast resin.

In view of the widespread use of both direct dyes and aminoplast resins on cellulosics, it is extremely undesirable to have the use of the resin for its function restrict the functioning of the dye for its purpose. Moreover, it is undesirable to be required to use an additional reagent for imparting resistance to degradation by ultraviolet light where such properties are required. It is therefore an object of the present invention to provide a means of treating cellulosics with aminoplast resins whereby crease-resistance and wrinkle-recovery properties can be imparted to the fabric without concurrently reducing the light-fastness of direct dyes which may be present on the fabric. It is a further object of the present invention to proivde a means whereby an aminoplast textile finish can be employed to impart crease-resistance to cellulosics and, at the same time, increase the stability of the fabric to degradation by ultraviolet light exposure. It is a further object of the present invention to provide new methylolated melamines which are capable of performing the above-noted functions. It is still a further object of the present invention to provide new cellulosic textile materials having the above-noted improved properties. Other objects will be apparent from the ensuing description of this invention.

It has now been discovered in accordance with this invention that etherified methylolated melamines of Formula I impart crease-resistant properties to cellulosic textile materials. Moreover, this function is accomplished for the most part without adverse effect on light-fastness of cellulosics which are dyed with direct dyes. This is a surprising discovery since cellulosics dyed with direct dyes are normally adversely affected as to light-fasteness when air-treated with conventional aminoplast textile finishes. In a further aspect of the present invention, certain etherified methylolated melamines of Formula I can be used to simultaneously impart crease-resistance and light stability so that upon exposure to ultraviolet light the tendency of the cellulosic material to degrade is materially reduced.

The textile finishing aminoplast resins used in this invention are applied to cellulosic textile materials by standard procedures, as by dipping, padding, spraying, etc., and the finishes are converted to an insoluble state by heating the treated fabrics in the presence of a catalyst. The treated cellulosic materials exhibit crease-resistance and wrinkle-recovery properties and, in addition, have a degree of light-fastness with respect to color retention when direct-dyed equal to or even better than untreated dyed cellulosics. Furthermore, when certain members of the class of compounds described by Formula I are used, the cellulosic material possesses a degree of light stability which is superior to that of untreated cellulosics.

Within the scope of Formula I is a sub-group of compounds which has the property of imparting light stability to cellulosic fibers. Such compounds can be characterized by the Formula II:

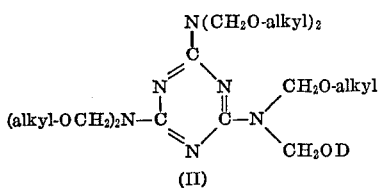

(II)

wherein "alkyl" is a lower-alkyl group of 1–4 carbon atoms and D is a benzophenone radical, a 2-phenylbenzotriazole radical, a benzylidene-malonate radical or a 2,4,6-triphenyl-s-triazine radical selected from those of the following formulae:

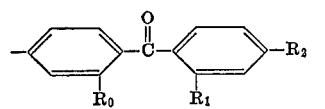

III

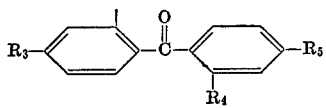

IV

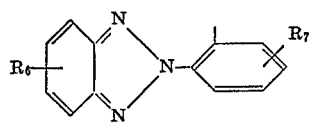

V

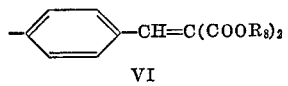

VI

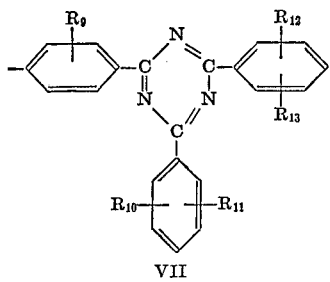

VII

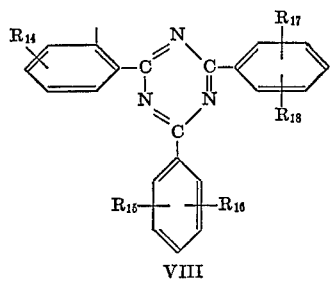

VIII

In the above formulae, $R_0$, $R_1$, $R_2$, $R_3$, $R_4$ and $R_5$ can be either hydrogen, hydroxyl, halogen (e.g., chloro, bromo or iodo), lower-alkoxy or lower-alkyl, provided that at least one of said R groups is a hydroxyl group; $R_6$ can be either hydrogen or lower-alkoxy; $R_7$ can be hydrogen, hydroxy, lower-alkoxy, chloro, bromo or iodo or lower-alkyl; $R_8$ can be lower-alkyl; and $R_9$ through $R_{18}$, inclusive, can be hydrogen, hydroxyl, lower-alkoxy or lower-alkyl.

The compound of Formula I can be made by reacting an N-halomethylmelamine of Formula IX with a compound of Formula X as follows:

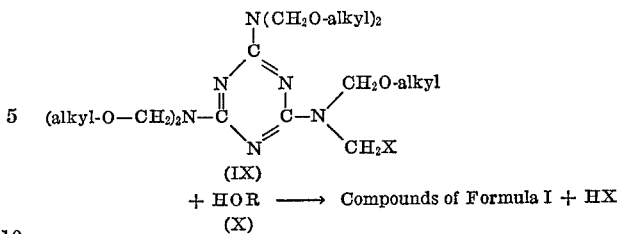

wherein "alkyl" is as defined above and X is chloro or bromo. The compounds of Formula IX and a process for their manufacture are disclosed and claimed in application Ser. No. 380,947, filed July 7, 1964, by Beachem et al.

Representative N-halomethylmelamines of Formula IX which can be used in this invention include N-chloromethyl-N,N',N',N'',N''-pentakis(methoxymethyl)-2,4,6-triamino-s-triazine,
N-bromomethyl-N,N',N',N'',N''-pentakis(methoxymethyl)-2,4,6-triamino-s-triazine,
N-bromomethyl-N,N',N',N'',N''-pentakis(ethoxymethyl)-2,4,6-triamino-s-triazine,
N-chloromethyl-N,N',N',N'',N''-pentakis(butoxymethyl)-2,4,6-triamino-s-triazine, etc.

Representative of the compounds of Formula X which can be used in the foregoing reaction are the following classes of reactants:

(A) 2-hydroxybenzophenones:

2-hydroxy-4-methoxybenzophenone,
2,4-dihydroxy-benzophenone,
2,2'-dihydroxy-4,4'-dimethoxybenzophenone,
2,2',4,4'-tetrahydroxybenzophenone,
2-hydroxy-4-butoxybenzophenone,
4'-chloro-2-hydroxy-4-octyloxybenzophenone,
2,4-dihydroxy-4'-t-butylbenzophenone,
2,2',4'-trihydroxybenzophenone,
2,4-dihydroxy-2'-methylbenzophenone,
2-hydroxy-2'-methyl-4-methoxybenzophenone,
2,2'-dihydroxy-4-methoxybenzophenone,
2-hydroxy-4-methoxy-4'-chlorobenzophenone,
2-hydroxy-4-methoxy-2',4'-dichlorobenzophenone, etc.

(B) 2- 2-hydroxyphenyl)benzotriazoles:

2-(2-hydroxy-5-methylphenyl)benzotriazole,
2-(2-hydroxy-5-octylphenyl)benzotriazole,
2-(2-hydroxy-4-methoxyphenyl)benzotriazole,
2-(2-hydroxy-4-n-octyloxyphenyl)benzotriazole,
2-(2,4-dihydroxyphenyl)benzotriazole,
2-(2,4-dihydroxyphenyl)benzotriazole,
2-(2,5-dihydroxyphenyl)benzotriazole,
2-(2,4-dihydroxy-5-chlorophenyl)benzotriazole,
2-(2,4-dihydroxyphenyl)-6-methoxybenzotriazole, etc.

(C) Benzylidene - malonic esters: diethyl p-hydroxybenzylidene-malonate, etc.

(D) Triphenyl-s-triazines:

2,4,6-tris(2,4-dihydroxyphenyl)-s-triazine,
2-(2,4-dihydroxyphenyl)-4,6-diphenyl-s-triazine,
2-(2,4-dihydroxyphenyl)-4,6-bis(2,4-dimethylphenyl)-s-triazine,
2,4,6-tris(2-hydroxy-4-octyloxyphenyl)-s-triazine,
2-(2-hydroxy-4-octyloxyphenyl)-4,6-bis(2,4-dimethylphenyl)-s-triazine,
2,4,6-tris(2-hydroxy-5-methylphenyl)-s-triazine,
2-(2-hydroxyphenyl)-4,6-bis(2,4-dimethylphenyl)-s-triazine,
2-(2-hydroxyphenyl)-4,6-bis(4-methoxyphenyl)-s-triazine, etc.

(E) Simple phenols: phenol, p-cresol, m-cresol, p-ethylphenol, p-n-propylphenol, p - n - butylphenol, p-isobutylphenol, p-phenylphenol, methylenediphenol, isopropylidenediphenol, etc.

The foregoing reaction to produce the compounds of Formula I is carried out with or without a solvent although it is preferable to use a solvent, particularly when both reactants are solids. It is also advantageous to use an acid acceptor such as an alkali metal carbonate or bicarbonate to take up the hydrogen halide which is formed by the reaction. The reaction is conveniently carried out at room temperature although any temperature between the freezing and boiling points of the reaction mixture may be used. Equimolar amounts of reactants can be advantageously used although an excess of either can be present without adverse effect.

The cellulosic textile materials which can be treated by the present invention include fibers, threads, yarns, knitted and woven cloth as well as non-woven fabrics and felted materials. These cellulosic materials will normally contain at least 15% cellulosic fibers such as cotton, viscose, cuprammonium rayons, linens, hemp, jute and ramie, either alone or mixed with themselves or other fibers.

Use of the aminoplast resins of Formula I is particularly advantageous for cellulosic textile materials which are dyed with a class of azo dyes known as "direct dyes" and are so-classified in the Color Index, second edition. Such dyes are characterized as anionic dyes having affinity for cellulosic fibers when applied from an aqueous dyebath containing an electrolyte. They are mainly azo dyes containing sulfonic acid groups as the sodium salts.

Representative direct dyes are Direct Yellow 6 (C.I. 4001), Direct Yellow 11 (C.I. 40000), Direct Orange 26 (C.I. 29150), Direct Red 1 (C.I. 22310), Direct Red 31 (C.I. 29100), Direct Blue 2 (C.I. 22590) and Direct Green 1 (30280). The dyed cellulosics are treated with textile finishes of the present invention using aqueous or organic solvent solutions or dispersions which can be applied by spraying, dipping, or padding according to well-known procedures. Between 0.5% and 40.0% solutions or dispersions are normally used. The amount of finish on the textile material can be varied usually between 0.5% and 40.0% based on the weight of the textile material with amounts between 2.5% and 15.0% preferably being used for practical crease-resistance and wrinkle-recovery properties. The treated fabrics are dried and then heated preferably in the presence of a catalyst to effect insolubility of the precondensate on the fabric (cross-linking, etc.). Curing temperatures between 275° and 400° F. for periods of about 20 minutes to 30 seconds are normally used. Suitable catalysts include those normally used for melamine-formaldehyde condensates and their etherates. These include the metal salts such as magnesium chloride, zinc nitrate and zinc chloride, ammonium salts such as ammonium sulfate, ammonium chloride, and organic amino hydrochlorides. In the case of magnesium chloride, the amount is between about 4.5% and 24%, preferably between 9% and 15%, of the anhydrous salt based on the weight of the precondensate. Use of the aminoplast resins of the sub-group outlined by Formula II is in accordance with the same general procedure.

The treated cellulosic fibers obtained by the present invention will be found to have a high degree of crease-resistance and wrinkle-recovery and will also be found to have unexpectedly good light-fastness when the cellulosics are dyed with direct dyes as above noted. In addition, the use of the aminoplast resins of sub-group II will be found to impart light stability to the fibers when they are exposed to ultraviolet light.

The following examples are presented to further illustrate the present invention.

EXAMPLE 1

A solution of 98.7 parts (0.25 mole) of N-chloromethyl-N,N',N',N'',N''-pentakis(methoxymethyl) - 2,4,6-triamino-s-triazine and about 100 parts of acetone is added during a 45-minute period to a solution of 53.6 parts (0.25 mole) of 2,4-dihydroxybenzophenone in 400 parts of acetone containing 70 parts (0.54 mole) of potassium carbonate while maintaining a temperature of 25–30° C. The reaction mixture is stirred until the reaction is essentially finished. After filtering and removing the acetone by evaporation, the residue is dissolved in benzene, the solution is extracted with water, and the benzene is removed from the non-aqueous phase by distillation. The product is N-(4-benzoyl-3-hydroxyphenoxymethyl) - N,N',N',N'',N''-pentakis(methoxymethyl) - 2,-4,6-triamino-s-triazine.

EXAMPLE 2

The procedure of Example 1 is followed, substituting 66.1 parts (0.25 mole) of diethyl p-hydroxybenzylidenemalonate for the 2,4-dihydroxybenzophenone. The product is N-{4-[2,2-bis(ethoxycarbonyl)vinyl]phenoxymethly}-N,N',N',N'',N'' - pentakis(methoxymethyl)-2,4,6-triamino-s-triazine.

EXAMPLE 3

The procedure of Example 1 is followed substituting 99.4 parts (0.25 mole) of 2-(2,4-dihydroxyphenyl)-4,6-bis(2,4 - xylyl)-s-triazine for the 2,4 - dihydroxybenzophenone. The product is N-{3-hydroxy - 4 - [4,6-bis(2,4-xylyl)-s-triazin - 2 - yl]phenoxymethyl}-N,N',N',N'',N''-pentakis(methoxymethyl)-2,4,6-triamino-s-triazine.

EXAMPLE 4

Pad baths are prepared containing 6.25% precondensate solids and 12% magnesium chloride based on the precondensate solids in the bath.

Pad Bath A

N-(4-benzoyl - 3 - hydroxyphenoxymethyl)-N,N',N', N'',N''-pentakis(methoxymethyl) - 2,4,6 - triamino-s-triazine (the product of Example 1) in 80% aqueous acetone.

Pad Bath B

N,N,N',N',N'',N'' - hexakis(methoxymethyl) - 2,4,6-triamino-s-triazine in water for purposes of comparison.

The pad baths are applied to 80 x 80 cotton percale at 5% O.W.F. precondensate solids by standard padding procedure using 80% wet pick-up. The treated fabrics are dried for 2 minutes at 225° F., and the finish is cured by heating the fabric at 350° F. for 1.5 minutes.

The tensile strength of the treated fabrics and a sample of the untreated fabric are measured initially and after four weeks' exposure to ultraviolet light in an ultraviolet radiation chamber. Loss in tensile strength as a result of the exposure to ultraviolet radiation is shown in Table I.

TABLE I

Percent loss in tensile strength:
  Finish A _____ 2.6
  Finish B _____ 20.0
  Untreated _____ 41.5

EXAMPLE 5

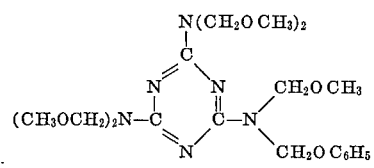

To a solution of 9.9 parts (0.105 mole) of phenol in about 90 parts of ethyl acetate containing 27.6 parts (0.20 mole) of finely divided potassium carbonate there is added over two hours, 39.8 parts (0.101 mole) of N - chloromethyl - N,N',N',N'',N''-pentakis(methoxymethyl) - 2,4,6 - triamino-s-triazine while maintaining the temperature at 25–30° C. When the reaction is essentially complete, 100 parts of water is added. After a short stirring period, the aqueous layer is separated and the solvent is removed from the organic phase by distillation in vacuo. The product, a viscous liquid, is N-(phenoxymethyl) - N,N',N',N'',N'' - pentakis(methoxymethyl)-2,4,6-triamino-s-triazine.

EXAMPLE 6

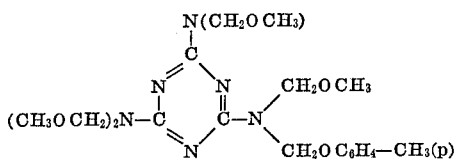

The procedure of Example 5 is followed, substituting 11.4 parts (0.105 mole) of p-cresol for the phenol. The product, a colorless viscous liquid, is N-(p-tolyloxymethyl)-N,N',N',N'',N''-pentakis(methoxymethyl) - 2,4,6-triamino-s-triazine.

EXAMPLE 7

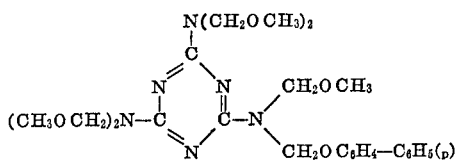

The procedure of Example 5 is followed, substituting 17.9 parts (0.105 mole) of p-phenylphenol for the phenol. The product, a colorless viscous liquid, is N-(p-biphenyloxymethyl) - N,N',N',N'',N'' - pentakis(methoxymethyl)-2,4,6-triamino-s-triazine.

EXAMPLE 8

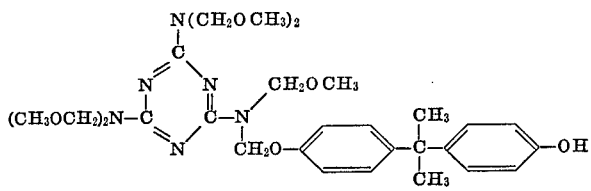

A solution of 97.3 parts (0.246 mole) of N-chloromethyl-N,N',N',N'',N''-pentakis(methoxymethyl - 2,4,6-triamino-s-triazine in about 90 parts of ethyl acetate is added over about one hour to a solution of 57.1 parts (0.25 mole) of 4,4'-isopropylidenediphenol in about 275 parts of ethyl acetate containing 69.1 parts (0.50 mole) of potassium carbonate while maintaining a temperature of 25–30° C. Stirring is continued until the reaction is essentially finished, whereupon 200 parts of water is added. The organic layer is separated from the aqueous layer and the organic solvent is removed by distillation in vacuo. The product is N-{4-[dimethyl(4-hydroxyphenyl)methyl]phenoxymethyl} - N,N',N',N'',N'' - pentakis-(methoxymethyl)-2,4,6-triamino-s-triazine.

EXAMPLE 9

Pad baths are prepared containing 6.25% of precondensate solids and 12% magnesium chloride based on the precondensate solids in the bath.

Pad Bath A

N - (phenoxymethyl) - N,N',N',N'',N''-pentakis(methoxymethyl) - 2,4,6 - triamino-s-triazine (product of Example 5) in 85% aqueous dimethylformamide.

Pad Bath B

N,N,N',N',N'',N'' - hexakis(methoxymethyl) - 2,4,6-triamino-s-trazine in water.

The pad baths are applied to 80 x 80 cotton percale at 5% O.W.F. of precondensate solids by standard padding procedure using 80% wet pick-up. The treated fabrics are dried for 2 minutes at 225° F. and the finish is cured by heating the fabric at 350° F. for 1.5 minutes.

The wrinkle-recovery of the treated fabrics and a sample of untreated fabric is measured on a Monsanto wrinkle-recovery tester following tentative test methods 66–1959T, described on page B-143 of the 1964 Technical Manual and Year Book of the American Association of Textile Chemists and Colorists.

The strength loss due to retained chloride is measured by Standard Test Method 92–1962, described on page B-102 of the above reference.

The acid rinses ("acid sours") are carried out by immersing the fabrics in an aqueous solution of zinc fluorosilicate followed by drying.

The results of the measurements are shown in Table II, Finishes A and B corresponding to Pad Baths A and B, respectively.

TABLE II

| Sample | Wrinkle recovery total warp and fill (degrees) | Strength loss due to retained chlorine (percent loss) | |
|---|---|---|---|
| | | Initial | 5 acid rinses |
| Finish A | 273 | 5 | 30 |
| Finish B | 274 | 7 | 69 |
| Untreated | 186 | 2 | 4 |

These results demonstrate that the Finishes A and B impart the same degree of wrinkle recovery, but that the phenoxymethyl derivative is superior to the other finish in resistance to damage caused by retained chlorine. Finish A would be acceptable with only 30% loss whereas Finish B with 69% loss would be unacceptable.

EXAMPLE 10

Pad baths are prepared containing 6.25% precondensate solids and 12% magnesium chloride based on the precondensate solids in the bath.

Pad Bath A

N - (phenoxymethyl)-N,N',N',N'',N'''-pentakis(methoxymethyl)-2,4,6-triamino-s-triazine (product of Example 5) in 70% isopropyl alcohol.

Pad Bath B

N,N,N',N',N'',N'' - hexakis(methoxymethyl) - 2,4,6-triamino-s-trazine in water.

The pad baths are applied to two samples of 80 x 80 cotton percale, one sample dyed with Direct Blue 78 (C.I. 34200) and the other with Direct Red 81 (C.I. 28160), at 5% O.W.F. precondensate solids by standard padding procedure using 80% wet pickup. The treated fabrics are dried for 2 minutes at 225° F., and the finish is cured by heating the fabric at 350° F. for 1.5 minutes. Also, a sample of the dyed, but untreated, fabric is rinsed in water and dried. A portion of each of the three fabrics of each color is washed in a home-style washing machine at 110–115° F. with water containing 0.25% of a commercial anionic surface active agent and 0.25% of sodium carbonate. The washed fabrics are dried.

Samples of the treated fabrics, both washed and unwashed, are exposed in a Fade-Ometer for 40 hours. The degree of fading of the exposed samples of fabric is measured as follows:

Spectrophotometric reflectance curves of the unexposed portion of dyed fabric and the exposed portion of dyed fabric are recorded for 21 wavelengths over the complete visual range. The spectrophotometric data are converted to colorimetric data by means of a digital computer. Numerical expressions of color in terms of 3-dimensional color coordinates are thus obtained. The two sets of colorimetric data, i.e., one set for unexposed fabric and one set for the exposed fabric, are then converted into a single number color difference (in NBS units) by the system of Wyszecki, J. Opt. Soc. Am. 53, 1318 (1963). The evaluation of the colorimetric data can be done by computer.

The single number color difference thus obtained can be considered in this instance to be strength ratio figures between unexposed and exposed fabric. Negative numbers indicate a loss in strength, i.e., fading. The larger the color difference number, the greater the difference in visual appearance between the two samples.

It is generally accepted that a color difference of 0.2 NBS unit is the minimum detectable amount which an experienced person can detect between two samples. The color difference for an acceptable commercial match is probably between 1.0 and 2.0 NBS units, as discussed in the monograph by Judd, "Color in Business, Science and Industry," Wiley, New York, 1952.

The results of the fading measurement are shown in Table III, Finishes A and B corresponding to Pad Baths A and B, respectively.

TABLE III

|  | Fading in NBS units | | |
| --- | --- | --- | --- |
|  | Finish A | Finish B | Untreated |
| Direct Red 81: | | | |
| Initial | −4.0 | −9.5 | −5.9 |
| Washed | −8.6 | −14.0 | −9.4 |
| Direct Blue 78: | | | |
| Initial | −3.2 | −8.7 | −3.0 |
| Washed | −3.9 | −8.8 | −3.5 |

These results demonstrate that the dyed fabrics finished with the finish of this invention (Finish A) is equal or better than the untreated dyed fabric, while the fabric treated with the Finish B fades considerably more than the untreated fabric.

EXAMPLE 11

Pad baths are prepared containing approximately equal number of moles of precondensate solids and 12% magnesium chloride based on the precondensate solids.

Pad Bath A

10% of N-{4-[dimethyl (4-hydroxyphenyl)methyl]phenoxymethyl} - N,N',N',N'',N'' - pentakis(methoxymethyl)-2,4,6-triamino-s-triazine (this invention) in 70% isopropyl alcohol.

Pad Bath B 6.25% of N,N,N',N',N'',N''-hexakis(methoxymethyl)-2,4,6-triamino-s-triazine (for comparison) in water.

The pad baths are applied to two samples of 80 x 80 cotton percale, one sample dyed with Direct Blue 78 (C.I. 34200) and the other with Direct Red 81 (C.I. 28160), at 8% and 5% O.W.F. of precondensate solids of Pad Baths A and B, respectively, by standard padding procedure using 80% wet pickup. The treated fabrics are dried for 2 minutes at 225° F., and the finishes are cured by heating the fabric at 350° F. for 1.5 minutes. The fabrics are then washed in a home-style washing machine at 110–115° F. with water containing 0.25% of a commercial anionic surface active agent and 0.25% of sodium carbonate. The washed fabrics are dried.

Samples of the treated fabrics, both washed and unwashed, are exposed in a Fade-Ometer for 40 hours. The degree of fading of the exposed samples of fabric is measured as described in Example 10.

Results of the fading measurement is shown in Table IV, Finishes A and B corresponding to Pad Baths A and B, respectively.

TABLE IV

|  | Fading in NBS units | | |
| --- | --- | --- | --- |
|  | Finish A | Finish B | Untreated |
| Direct Red 81 | −9.0 | −16.6 | −11.0 |
| Direct Blue 78 | −3.6 | −10.2 | −4.0 |

EXAMPLE 12

Pad baths are prepared containing 6.25% precondensate solids and 12% magnesium chloride based on the precondensate solids in the bath.

Pad Bath A

N-(biphenylyloxymethyl) - N,N',N',N'',N'' - pentakis(methoxymethyl)-2,4,6-triamino - s - triazine (product of this invention) in acetone.

Pad Bath B

N,N,N',N',N'',N'' - hexakis(methoxymethyl) - 2,4,6-triamino-s-triazine in water.

The pad baths are applied to a sample of 80 x 80 cotton percale dyed with Direct Red 81 (C.I. 28160) at 5% O.W.F. of precondensate solids by standard padding procedure using 80% wet pickup. The treated fabrics are dried for 2 minutes at 225° F., and the finishes are cured by heating the fabrics at 350° F. for 1.5 minutes. Also, a sample of the dyed, but untreated, fabric is rinsed in water and dried. A portion of each of the fabrics of each color is washed in a home-style washing machine at 110–115° F. with water containing 0.25% of a commercial anionic surface active agent and 0.25% of sodium carbonate. The washed fabrics are dried.

Samples of the treated fabrics, both washed and unwashed, are exposed in a Fade-Ometer for 60 hours. The degree of fading of the exposed samples of fabric is measured as described in Example 10.

The results of the fading measurements are shown in Table V, Finishes A and B corresponding to Pad Baths A and B, respectively.

TABLE V

|  | Fading in NBS units | |
| --- | --- | --- |
|  | Initial | Washed |
| Finish A | − 5.3 | −11.8 |
| Finish B | −12.6 | −16.7 |
| Untreated | −10.3 | −11.3 |

It can be seen that Finish A is superior to Finish B in resistance to light-fading and is generally superior or equal to the untreated dyed fabric.

What is claimed is:

1. A process for improving textile fibers which comprises impregnating a cellulosic textile material with a solution of a compound of the formula:

$$\begin{array}{c} N(CH_2O\text{-alkyl})_2 \\ | \\ C \\ N \diagup \diagdown N \\ \| \quad \| \quad CH_2O\text{-alkyl} \\ (\text{alkyl-O } CH_2)_2N-C \quad C-N \\ \diagdown \diagup \quad \diagdown \\ N \quad CH_2OR \end{array}$$

wherein "alkyl" is an alkyl radical of 1 to 4 carbon atoms and R is a member selected from the group consisting of phenyl, naphthyl, biphenylyl, benzoylphenyl, acetylphenyl, phenylalkylphenyl, phenoxyphenyl, phenylthiophenyl, phenylaminophenyl, 2,4 - diphenyl-s-triazinyl-6-phenylene or a 1,2,3-benzotriazole-2-phenylene radical and heating the impregnated textile material in the presence of a catalyst to cure the finish to a substantially insoluble state, whereby the textile material obtains good crease resistance and wrinkle recovery properties.

2. The process of claim 1 wherein the cellulosic material has been pre-treated with a direct dye.

3. The process of claim 2 wherein R is a radical of the following formula:

$$\begin{array}{c} O \\ \| \\ \diagup\diagdown \quad C \quad \diagup\diagdown \\ \diagdown\diagup - - \diagdown\diagup -R_2 \\ R_0 \quad R_1 \end{array}$$

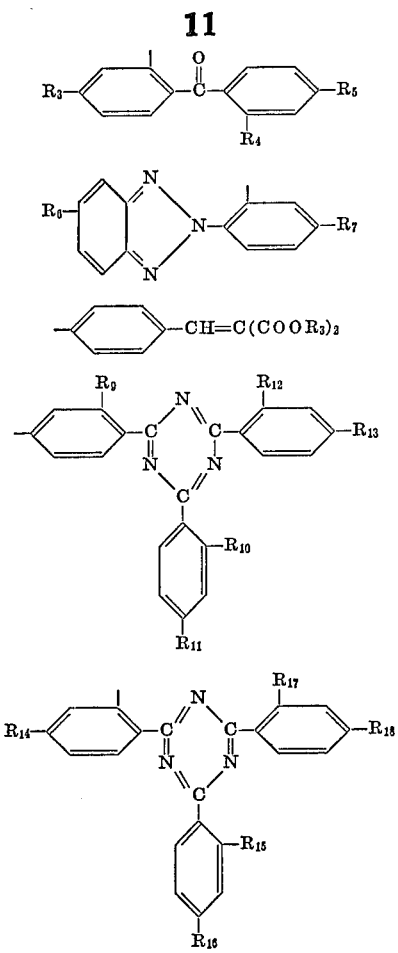

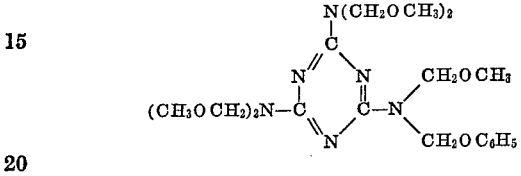

wherein each of $R_0$, $R_1$, $R_2$, $R_3$, $R_4$ and $R_5$ being either hydrogen, hydroxyl, halogen lower-alkoxy or lower-alkyl, provided at least one of said "R" radicals is hydroxy; $R_6$ being either hydrogen or lower-alkoxy; $R_7$ being hydrogen, hydroxy, lower-alkoxy, halo or lower-alkyl; $R_8$ being lower-alkyl; and each of $R_9$ to $R_{18}$ inclusive being either hydrogen, hydroxy, lower-alkoxy or lower-alkyl.

4. The process of claim 3 wherein the melamine has the formula:

5. The treated cellulosic material prepared by the process of claim 1.

6. The treated cellulosic material prepared by the process of claim 2.

References Cited
UNITED STATES PATENTS 3,535,318    10/1970    Oppelt          8—116.3Y DONALD LEVY, Primary Examiner J. CANNON, Assistant Examiner U.S. Cl. X.R.

8—17, 115.7, 116.3